Patented Nov. 23, 1948

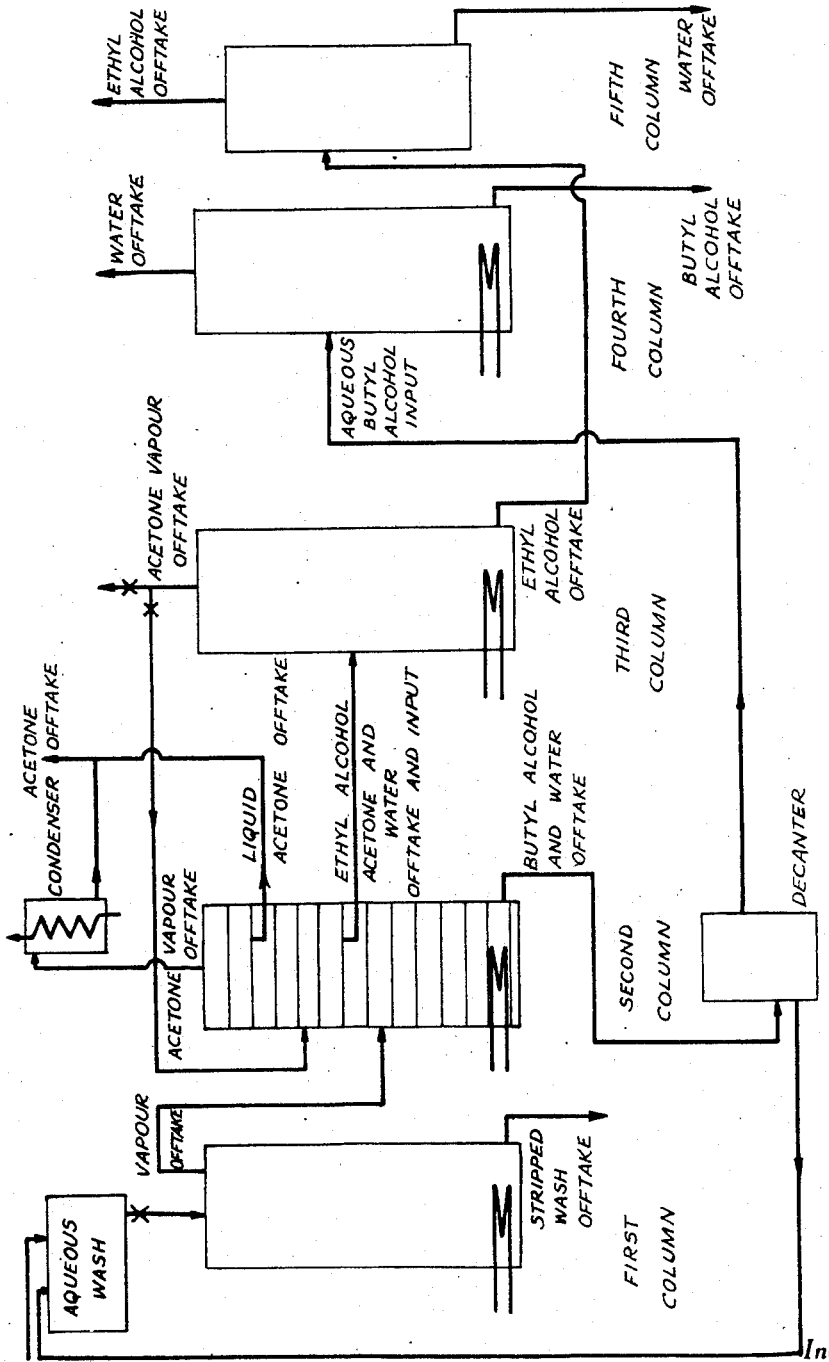

2,454,734

UNITED STATES PATENT OFFICE 2,454,734

DISTILLATION OF ACETONE, ETHANOL, AND BUTANOL FROM AQUEOUS SOLUTIONS THEREOF

Harold Nunnerley Darlington, Birkenhead, and Harold Holdsworth, Wirral, England, assignors to Commercial Solvents (Great Britain) Limited, Bromborough Port, England, a British company Application November 21, 1947, Serial No. 787,400
In Great Britain November 25, 1946

8 Claims. (Cl. 202—40)

This invention relates to the recovery, by distillation, of butyl alcohol, ethyl alcohol and acetone from aqueous solutions, in particular such aqueous solution as are obtained by the fermentation of carbohydrate solutions.

According to the invention the aqueous solution containing the acetone and the said alcohols, e. g. a fermentation wash, is stripped, in a so-called beer column or the like stripping column, of its organic admixtures and the vapours comprising acetone and the said alcohols are withdrawn from the head of the column and introduced into a second column at an intermediate point therein, the acetone being withdrawn from the head of said second column, a liquid mixture of ethyl alcohol, acetone and water being withdrawn from a point between the inlet of said vapours into said second column and the head thereof and a mixture of butanol and water substantially free from other organic solvents being withdrawn from the bottom of said second column and the said acetone-ethyl alcohol-water mixture being then conducted into a third column from the head of which acetone with a greatly reduced admixture of ethyl alcohol is withdrawn and from the bottom of which ethyl alcohol, substantially free from acetone, is withdrawn. It is a feature of the invention that, in addition to the acetone vapours withdrawn from the head of the second column, some acetone is withdrawn, from a point near the head of said second column, in the liquid phase. It is another feature of the invention to return the acetone-ethyl alcohol mixture withdrawn from the head of the third column to the top part of the second column.

The first column is so arranged as regards its dimensions and heating that the aqueous solution, e. g. the fermented wash, passed through is substantially completely stripped of the organic solvents contained therein. The vapours from this column are introduced into the second column preferably below but near the middle of the second column, which is advantageously a plate column. From one of the top three plates of the said second column the acetone is removed in the liquid phase, the temperature of the liquid acetone being near the boiling point thereof. Thereby the substantially complete removal of carbon dioxide dissolved therein is achieved.

The heating and dimensions of said second column are such that at the base thereof butyl alcohol in admixture with water substantially free from acetone and ethyl alcohol may be collected, advantageously after cooling, in a vessel in which it separates into two layers, the top layer containing about 80% butanol and 20% water and a bottom layer containing about 92% water and 8% butanol. The bottom layer is advantageously returned to the first stripping column. The top layer consisting of 80% butanol may be further concentrated in a fourth column or dried in any other convenient manner.

The mixture of ethyl alcohol, acetone and water is withdrawn in the liquid phase from a point in the second column which point is situated between the head of the second column and the inlet of the vapours issuing from the first stripping column, preferably so that the proportions of the components in the withdrawn liquid mixture is approximately 5 parts of ethyl alcohol to 80 parts of acetone to 15 parts of water. This aqueous ethyl alcohol-acetone mixture is then introduced into the third column where a fractionation giving a tail product containing 30-40% of ethyl alcohol is achieved whilst, from the head of said third column, acetone containing traces of ethyl alcohol is taken off. This mixture of acetone with some ethyl alcohol may be collected and subjected in batches to refining.

The accompanying drawing shows diagrammatically the first column to which the wash is fed and it also shows how the vapours taken from the head of this first column are passed into the second column and the several paths of the various head and tail products from this second column in their further progress through the above described distillation process. The drawing also shows where the various end products are removed from the system.

Although the accompanying drawing illustrates a specific arrangement of apparatus for use in the process of this invention, it is to be understood that the drawing is illustrative only and is not to be regarded as limiting the scope of the appendent claims which are intended to embrace all variants both as to the apparatus and as to the process as indicated by the drawing which would be obvious to a person skilled in the art.

We claim:

1. A process for the recovery of butyl alcohol, ethyl alcohol and acetone from an aqueous solution thereof which comprises stripping said aqueous solution of said alcohols and acetone in a stripping column of the nature of a beer column, withdrawing said alcohols and acetone from the head of said column in the vapour phase, introducing the vapours into a second column at an intermediate point therein, withdrawing acetone from the head of said second column, withdrawing a liquid mixture of ethyl alcohol, acetone and water from said second column at a point between the inlet of said vapours and the head thereof, and withdrawing a mixture of butyl alcohol and water, substantially free from other organic solvents, from the bottom of said second column, conducting said liquid mixture of ethyl alcohol, acetone and water into a third column, withdrawing from the head of said third column acetone with a greatly reduced ethyl alcohol content, and withdrawing from the bottom of said third column ethyl alcohol substantially free from acetone.

2. A process according to claim 1 wherein, in addition to withdrawing acetone from the head of said second column, acetone is withdrawn in the liquid phase from a point near to the head of said second column.

3. A process according to claim 2 wherein the acetone withdrawn in the liquid phase from a point near to the head of said second column is withdrawn from one of the top three plates of said second column at a temperature near to its boiling point.

4. A process according to claim 1 wherein said acetone with a greatly reduced ethyl alcohol content is introduced into said second column at a point near to the head thereof.

5. A process according to claim 4 wherein said alcohols and acetone withdrawn from the head of the first aforesaid column in the vapour phase are introduced into said second column at a point near to but below the middle thereof.

6. A process according to claim 1 wherein said alcohols and acetone withdrawn from the head of the first aforesaid column in the vapour phase are introduced into said second column at a point near to but below the middle thereof.

7. A process according to claim 1 wherein said mixture of butyl alcohol and water withdrawn from the bottom of said second column is separated into two layers and the bottom layer introduced into the first aforesaid column.

8. A process according to claim 7 wherein the upper of said two layers is introduced into a fourth column for the further concentration of the butyl alcohol therein.

HAROLD NUNNERLEY DARLINGTON.
HAROLD HOLDSWORTH.

REFERENCES CITED

The following references are of record in the file of this patent:

UNITED STATES PATENTS

| Number | Name | Date |
| --- | --- | --- |
| 2,080,194 | Barbet | May 11, 1937 |
| 2,095,347 | Reichardt | Oct. 12, 1937 |